(12) United States Patent
Milet et al.

(10) Patent No.: US 6,376,960 B1
(45) Date of Patent: Apr. 23, 2002

(54) TWO SLOT WINDING FOR A ROTATING ELECTRICAL MACHINE

(75) Inventors: Yves Milet, Assevent; Philippe Huart, Maubeuge; Robert Deltour, Jeumont, all of (FR)

(73) Assignee: Jeumont Industrie, Courbevoie (FR)

( * ) Notice: Subject to any disclaimer, the term of this patent is extended or adjusted under 35 U.S.C. 154(b) by 0 days.

(21) Appl. No.: 09/446,065

(22) PCT Filed: Jun. 19, 1998

(86) PCT No.: PCT/FR98/01298

§ 371 Date: May 26, 2000

§ 102(e) Date: May 26, 2000

(87) PCT Pub. No.: WO98/59409

PCT Pub. Date: Dec. 30, 1998

(30) Foreign Application Priority Data

Jun. 20, 1997 (FR) .............................. 97 07732

(51) Int. Cl.⁷ .................. H02K 15/085; H02K 3/12; H02K 3/28
(52) U.S. Cl. .................. 310/180; 310/184; 310/207
(58) Field of Search .................. 310/179, 180, 310/268, 184, 201, 207, 208

(56) References Cited

U.S. PATENT DOCUMENTS

| | | | | |
|---|---|---|---|---|
| 1,796,422 A | * | 3/1931 | Apple | 310/201 |
| 1,826,295 A | * | 10/1931 | Apple | 310/201 |
| 2,683,232 A | | 7/1954 | Weissheimer | 310/268 |
| 3,622,818 A | * | 11/1971 | Payen | 310/13 |
| 3,719,844 A | | 3/1973 | Easton | 310/184 |
| 4,200,817 A | * | 4/1980 | Bratoljic | 310/198 |
| 4,227,107 A | * | 10/1980 | Ban et al. | 310/198 |
| 4,296,344 A | * | 10/1981 | Rabe | 310/184 |
| 4,319,152 A | * | 3/1982 | Van Gils | 310/201 |
| 4,619,040 A | * | 10/1986 | Wang et al. | 310/184 |
| 5,376,852 A | | 12/1994 | Kawamura et al. | 310/198 |
| 5,449,962 A | * | 9/1995 | Shichijyo et al. | 310/184 |
| 5,942,830 A | * | 8/1999 | Hill | 310/201 |

FOREIGN PATENT DOCUMENTS

| | | | | |
|---|---|---|---|---|
| DE | 4209532 | | 3/1992 | .......... H02K/15/09 |
| GB | 2082482 | | 3/1982 | ......... H02K/15/085 |
| JP | 56010053 | | 2/1981 | .......... H02K/15/06 |
| JP | 61-121731 | * | 6/1986 | ............ H02K/3/12 |
| JP | 7-107715 | * | 4/1995 | .......... H02K/17/08 |

* cited by examiner

Primary Examiner—Burton S. Mullins
(74) Attorney, Agent, or Firm—Leydig, Voit, & Mayer, Ltd.

(57) ABSTRACT

A process for production of a winding for the magnetic circuit of a rotating electrical machine in which the conductors are placed in slots of the magnetic circuit in two slot planes. The process includes producing the two planes of conductors successively and independently, each plane of conductors having at least one layer of conductors.

8 Claims, 4 Drawing Sheets

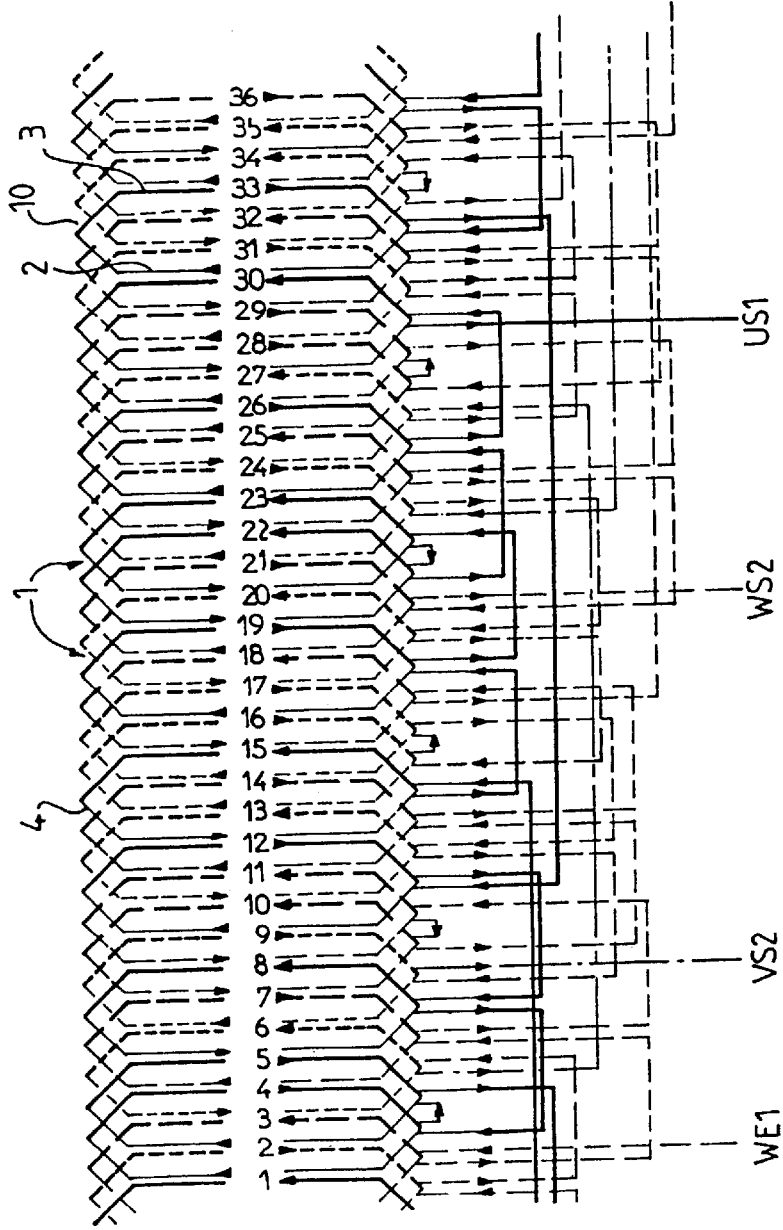
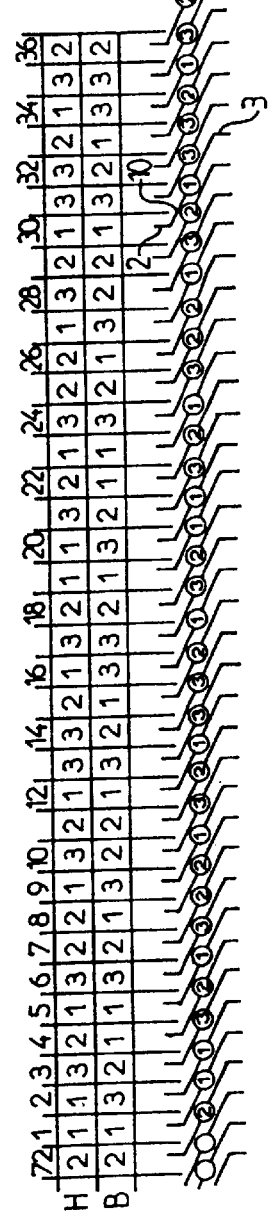
FIG.1
FIG.2a
FIG.2b

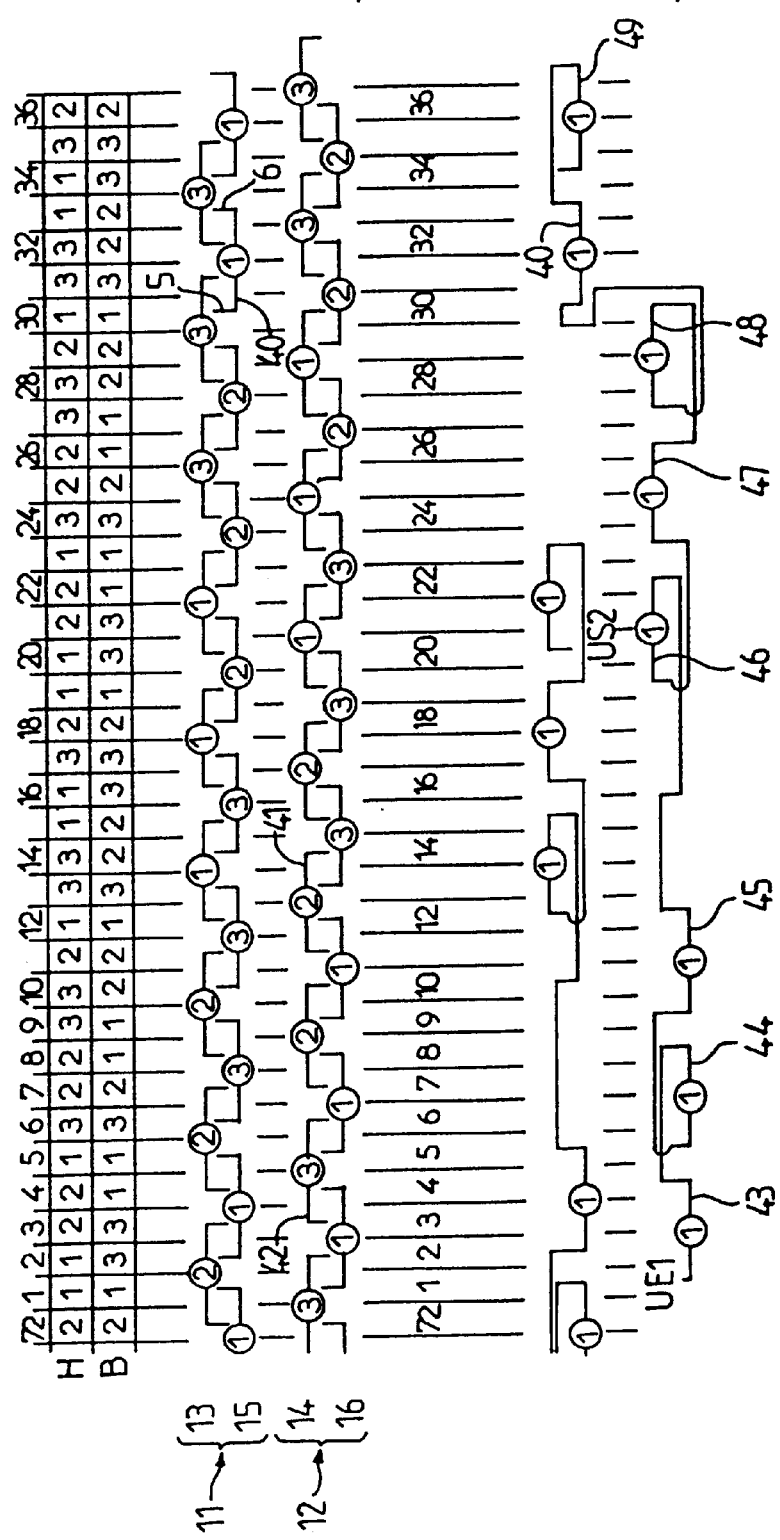

TWO SLOT WINDING FOR A ROTATING ELECTRICAL MACHINE

FIELD OF THE INVENTION

The invention relates to the rotating electrical machines which have at least two coaxial armatures separated by an air gap, a stationary stator and a rotor given a uniform movement.

BACKGROUND OF THE INVENTION

Essentially, multiphase and multipole AC generators concern us here.

These armatures can be cylindrical, and the machine then creates a radial field. The conductors are placed in slots distributed on the internal periphery of the stator or the external periphery of the rotor. The conductors are parallel to the axis of rotation of the machine.

These armatures can also take on the form of a disk, and in this case, the machine creates an axial field. The conductors are placed in radial slots; they are therefore perpendicular to the axis of rotation of the machine.

Conventionally, the conductors are arranged in the slots of a magnetic circuit based on different winding types chosen as a function of the application.

The windings are produced using coils or bars.

The coils are produced using conductors which are insulated from one another and wound in concentric turns. Each coil is placed in two different slots of the magnetic circuit. The two parts of the coil situated in the slots are generally called bundles, and the part of the coil which is outside of the magnetic circuit is generally called the end winding.

Bars are conductors which are not closed on themselves and can be made up of several flattened elements in parallel. The parts situated in the slots are also called bundles. Connections are provided between the bars.

We distinguish principally the windings with concentric sections or the windings with crisscross sections or bars.

The windings with concentric sections or coils can be produced by winding with alternating poles or with consecutive poles.

The conductors are placed in a single slot plane which is composed of two layers produced successively for a winding with consecutive poles, and for a winding with alternating poles, the same number of layers as the number of phases.

These windings have the advantage of being produced in tiers; their prouduction can therefore be easily automated.

However, they have limits and disadvantages.

The windings in one plane are today essentially intended for low power machines for which the cost of manufacturing is preponderant in view of their technical performance. In this case, the conductors are made of round wires with a slot filling which is less than that which can be obtained with flattened conductors, and the winding pitch is a whole number, to the detriment of the behavior of the rotating field.

However, it is possible to produce this type of winding with coils of different geometry using flattened conductors which, because of the differences in bulk of the end windings, can lead to imbalances between phases and to magnetic leakage.

In order to improve the progressiveness of the rotating magnetic field, the production of windings with a shortened pitch is feasible, but its possibilities are limited and it leads to winding assymmetries.

The windings with crisscrossing sections or bars can be produced in the form of a mantle, overlapping or undulating.

These windings allow shortened pitches, and, consequently, they make possible the elimination of certain electrical harmonics.

The most common windings are the overlapping and the undulating which are generally used for machines of medium and high power.

For these applications, the windings are produced manually, from bars in the case of the undulating type, and from bars or coils in the case of the overlapping type.

We are most concerned with the overlapping windings in which the conductors are arranged in the slots in two different planes separated by insulating materials.

These windings have numerous advantages from an electrical standpoint. In particular, they offer great flexibility to the designer of the electrical machine in producing fractional pitches.

Conventionally, a coil is produced by winding rectangular conductors, insulated beforehand, in a winding tower to obtain one or more concentric turns.

The coil generally has the shape of a shuttle which is then stretched in order to open the coil and raise the end winding.

The spacing between the two large sides of a coil that is intended to be placed in slots of a magnetic circuit is a function of the number of poles. The two large sides of the coil are in planes which are offset with respect to one another; these two sides are therefore also situated in different planes of the slots when the coil is placed in the magnetic circuit. This allows one to produce the electrical circuit of the machine by arranging the coils one after another in the magnetic circuit.

An overlapping winding produced from coils has a major disadvantage.

The positioning of all the coils requires raising of the coils arranged first in order to be able to insert the last coils. This operation, ordinarily called pitch raising, is an essentially manual operation, which makes any automation difficult.

It has therefore appeared necessary to propose another type of winding, intended for the magnetic circuit of an electrical machine, which is easily automated and which has the same electrical advantages as an overlapping-type winding.

SUMMARY OF THE INVENTION

The invention relates, therefore, to a process for production of a winding for the magnetic circuit of a rotating electrical machine in which the conductors are placed in the slots of the magnetic circuit in two slot planes, the process comprising producing the two planes of conductors successively and independently, each plane of conductors having at least one layer of conductors.

Inasmuch as at least one plane of conductors has at least two layers of conductors, they are produced successively and independently in such a way that the conductors of each layer are situated in the same plane of the magnetic circuit.

Advantageously, the layers of a plane of conductors are formed by coils, each of them having two bundles and two end windings whose thickness is equal to a fraction of the thickness of the bundles, the coils being symmetrical with respect to the median plane of the bundles.

Preferably, the two planes of conductors are identical.

In order to obtain a winding whose electrical performances are similar to those of an overlapping-type winding, an offset by a determined number of slots is provided between the two planes of conductors.

It is advantageous to produce each of the electrical circuits of a determined phase continuously to avoid any later connection between the conductors.

Preferably, the coils are formed directly in the slots of the magnetic circuit.

Furthermore, the process can be implemented with consecutive or alternating poles.

The invention also relates to a winding produced by the preceding process for a three-phase electrical machine, the assignment of the phases to each conductor being identical to that of a corresponding overlapping-type winding, with the exception of a phase inversion from one slot plane to the other as a function of the pitch in certain defined slots.

For a winding of the type with a pitch of 1 to 4, the phase inversion is produced for every other slot.

BRIEF DESCRIPTION OF THE DRAWINGS

The invention will be more clearly understood and other aims, advantages, and characteristics of it will appear upon reading the following description given based on the appended drawings in which:

FIG. 1 is an expanded view of a conventional overlapping winding for a three-phase machine with 72 slots, 20 poles, and a pitch of 1 to 4.

FIGS. 2a and 2b respectively show the distribution of the conductors in the slots and the assignment of the three phases in the winding.

FIGS. 4a and 4b which respectively show the distribution of the conductors in the slots and the assignment of the three phases in the winding.

FIG. 5 is a representation for a single phase case of the distribution of the conductors in the slots and of their electrical connection, corresponding to FIGS. 3, 4a and 4b.

DETAILED DESCRIPTION OF PREFERRED EMBODIMENTS

Figure 3:
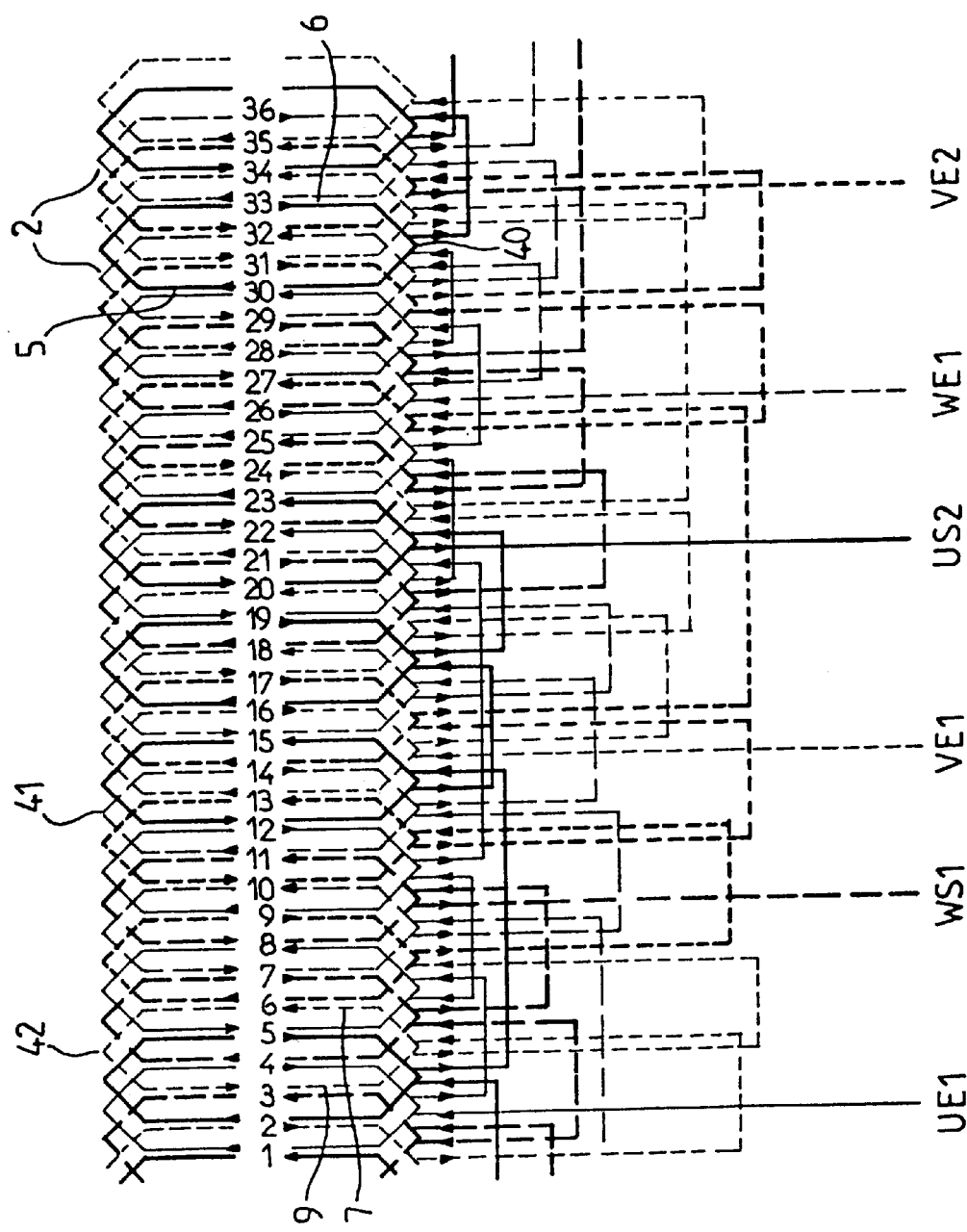
FIG. 3 is a partial expanded view of a winding for the same machine according to the invention.

Reference is first made to FIG. 1. The machine taken as an example is a three-phase machine with 72 slots, 20 poles, and a winding of the type with a pitch of 1 to 4.

There is software today that integrates the expertise of the coil winders, and that makes it possible, for a given machine, to establish an expanded view of the corresponding overlapping winding.

The overlapping winding is conventionally produced in two slot planes, ordinarily called "slot top" and "slot bottom," the conductors of each plane being separated by insulating materials.

Conventionally, the "slot top" plane is situated closest to the air gap, whereas the "slot bottom" plane is the plane furthest from the air gap.

The parameters for establishing an overlapping-type winding are the following: the number of slots of the magnetic circuit, the number of poles, the number of phases, and the direction of rotation of the machine.

The number of slots, the number of poles, and the pitch are interdependent, but the winding can be produced with a shortened pitch or with an elongated pitch. The winding can also have a whole number pitch.

Three phases are provided in general. The direction of rotation of the machine determines the order in which the phases are assigned to the conductors.

Existing software makes it possible, for the chosen machine example, to establish the corresponding overlapping winding.

Thus, FIG. 1 shows the distribution of the conductors in slots 1 to 36, whose numbers appear in the diagram.

FIG. 1 is a partial view of the complete winding diagram that relates to slots 1 to 72.

The conductors are present in the form of coils 1.

For each coil, the straight parts correspond to the bundles.

In the case of coil 10, for example, reference 2 designates the bundle placed in "slot top" plane 30. Bundle 2 is represented by thin lines.

Reference 3 designates the bundle placed in "slot bottom" plane 33. Bundle 3 is represented by fat lines.

Reference 4 designates an end winding.

FIG. 1 also shows the electrical connections between the different coils 1.

They form three groups of parallel electrical circuits, each of them being assigned to a phase.

The continuous long and short dotted lines identify the coils belonging to the electric circuit of one of the three phases.

Thus, the two parallel electrical circuits of phase 1 have as input, respectively UE1 and UE2 (not represented), and as output, respectively US1 and US2 (not represented). Likewise, the two parallel electrical circuits of phase 2 have as input, respectively, WE1 and WE2 (not represented), and as output, respectively, WS1 (not represented) and WS2. Finally, the two parallel electrical circuits of phase 3 have as input, respectively, VE1 and VE2 (not represented), and as output, respectively, VS1 (not represented) and VS2.

FIGS. 2a and 2b are representations of the winding that indicate the distribution of the coils in the slots and the assignment of the phases without specifying the electrical connection of the conductors.

Thus, FIG. 2a designates a double entry table: the slot numbers are noted in the top row, and the positions of the conductors are noted in the columns: first the "slot top" plane (H) in the middle now, then the "slot bottom" plane (B) in the bottom row.

Noted at the intersection of a row and a column is the number of the phase to which the corresponding conductor is assigned, which is situated in the indicated slot plane of a given slot.

As an example, the conductor situated in the "slot top" plane of slot 4 is assigned a phase 2 electrical circuit.

Furthermore, FIG. 2b is a graphic representation of the distribution of coils 1 in the slots of the magnetic circuit of the machine. For each slot, the number placed in a circle indicates the phase corresponding to the electrical circuit of which this circuit is a part.

Taking coil 10 as example, FIGS. 2a and 2b show that bundle 2 of coil 10 is placed in the "slot top" plane of slot 30, whereas bundle 3 is placed in the "slot bottom" plane of slot 33, bundles 2 and 3 being assigned to phase 1.

FIG. 2a is generally completed by tables and graphic representations of the distribution of the coils established for each phase. They are not illustrated in FIG. 2a.

Thus, as shown by FIG. 2b, each of coils 1 allowing the production of an overlapping winding is placed in two offset slot planes: the "slot top" plane and the "slot bottom" plane.

As indicated in the preceding, after production is completed, this type of winding requires a manual pitch raising operation.

Reference is now made to FIGS. 3 to 5 which illustrate the winding, according to the invention, for the machine example already used for FIGS. 1 and 2, the winding is also of the type with a pitch of 1 to 4.

FIGS. 3 to 5 illustrate this winding for slots 1 to 36 only. The complete winding diagram relates to slots 1 to 72.

The winding according to the invention is produced in two slot planes, respectively, consisting of the "slot top" plane and the "slot bottom" plane of the magnetic circuit.

Such a winding has the advantage of being able to create a progressively rotating field. The conventional overlapping winding also has this advantage.

However, in the winding according to the invention, the conductors placed in one slot plane are independent from the conductors situated in the other plane. Thus, the winding is produced successively in each plane.

The idea of independence means that the bundles of the same coil are situated in the same slot plane.

Likewise, in a determined plane of the winding, there are one or more layers of conductors.

The terms "plane of conductors" and "winding plane" designates all of the conductors placed in a slot plane, "slot bottom" or "slot top."

When a winding plane has several layers of conductors, they are produced successively and independently. The conductors of the same layer are situated in the same plane of the magnetic circuit.

The idea of independence in this case means that the bundles of the same coil are all situated in the same layer of the same winding plane. However, when the winding is finished and supplied with current, there is, of course, electrical interaction between the different layers of the winding.

Thus, bundles of the same coil are placed in the same slot plane. Furthermore, if, in the same slot plane, the winding is composed of several layers of conductors, the bundles of the same coil are situated in the same layer of the plane of conductors.

This fundamentally distinguishes the winding according to the invention from a conventional overlapping winding, as described in reference to FIGS. 1 and 2a. In effect, in an overlapping winding, conductors belonging to the same coil are placed in two different slot planes.

This is first of all illustrated by FIG. 3, which is a partial expanded view of a winding, according to the invention, for a three-phase machine, with 72 slots, 20 poles, and a pitch of 1 to 4.

FIG. 3 shows the winding diagram for slots 1 to 36; the complete diagram relates to slots 1 to 72. This is a representation of the same type as that of FIG. 1. It also shows the same electrical connection between the different coils.

Coils 2 are distributed in two slot planes.

The first plane consists of the "slot top" plane, and the coils of the first plane are represented by fat lines.

Likewise, the second plane consists of the "slot bottom" plane, and the coils are represented by thin lines.

Furthermore, the continuous, long and short dotted lines identify the coils belonging to the electric circuit of one of the three phases.

As an example, coil 40 is situated in the "slot top" plane. Bundles 5 and 6 of coil 40 are respectively placed in the top of slot 30 and of slot 33. It is represented by continuous lines, and it is in the electrical circuit of phase 1.

Coil 41 is situated in the "slot bottom" plane. It is represented by long dotted lines, and it belongs to the electrical circuit of phase 2.

Likewise, coil 42 is situated in the "slot bottom" plane. Bundles 7 and 9 of coil 42 are respectively placed in the bottom of slot 6 and slot 3. It is represented by short dotted lines, and it is in the electrical circuit of phase 3.

Thus, the bundles of the same coil are placed in the same slot plane.

FIG. 4a is a representation similar to that of FIG. 2a.

It is a double entry table of the type illustrated in FIG. 2a, and FIG. 4b is a graphic representation of coils 2 in the slots of a magnetic circuit of the machine.

FIG. 4b shows the two winding planes: "slot top" plane 11 and "slot bottom" plane 12.

In the example illustrated in FIG. 4b, each plane of conductors 11 and 12, respectively, is produced in two layers, 13 and 15, and 14 and 16 respectively. Each plane could also be produced in the form of one layer of conductors or more than two layers of conductors.

One finds upon examining coils 40, 41 and 42, identified in FIG. 3, that coil 40 is in first layer 15 of "slot top" plane 11, and coils 41 and 42 are in second layer 14 of "slot bottom" plane 12.

Coils 2 are connected together in such a way as to constitute two parallel circuits for each of the three phases. The number placed in a circle for each coil indicates the phase corresponding to the electrical circuit to which the coil belongs.

As shown in FIG. 3, the two circuits of phase 1 have as input, respectively, UE1 and UE2 (not represented), and as output, respectively, US1 (not represented) and US2. The two circuits of phase 2 have as input, respectively, VE1 and VE2, and as output, respectively, VS1 and VS2 (not represented). Finally, the two circuits of phase 3 have as input, respectively, WE1 and WE2 (not represented), and as output, respectively, WS1 and WS2 (not represented).

The winding according to the invention has the advantage that it can be produced in an automated manner, whether the coils are manufactured beforehand or directly in the magnetic circuit.

In effect, each layer of conductors is produced successively by inserting coils according to the diagram of FIG. 4b, for example, and beginning with layer 16 or by producing the coils directly in the slots by winding the conductors.

Figure 6:
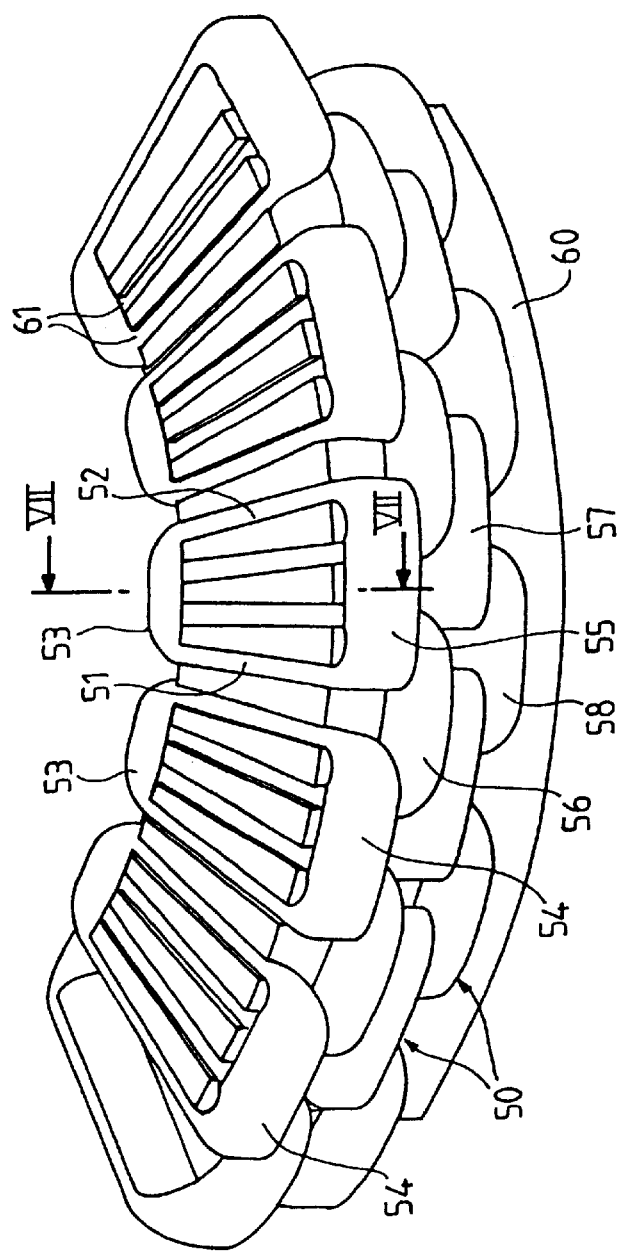
FIG. 6 is a partial perspective view of a magnetic circuit as an example of a discoid machine equipped with a winding according to the invention.

FIG. 6 illustrates coils which are advantageously used to produce a plane of conductors having at least two layers of conductors, as illustrated in FIG. 4b.

FIG. 6 partially represents magnetic circuit 60 of a discoid machine having slots 61 and equipped with a winding with a pitch of 1 to 4.

Each of coils 50 has two bundles 51 and 52 and two end windings 53 and 54. They are planar and symmetrical with respect to the median plane of their bundles. This median plane is represented by line VII—VII that passes through the middle of each of end windings 53 and 54, and is perpendicular to a plane passing through the two bundles 51 and 52.

Figure 7:
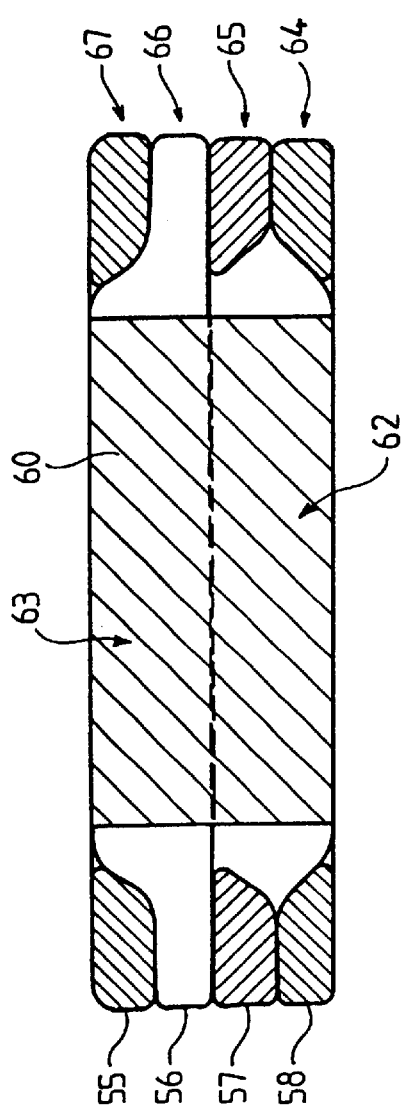
FIG. 7 is a view in cross section through VII—VII of FIG. 6.

Reference is also made to FIG. 7, which is a view in cross section through VII—VII of FIG. 6.

This figure shows the coils in the two slot planes: "slot bottom" plane 62 and "slot top" plane 63.

Coils 55, 56, 57 and 58 have a particular shape in order to allow the end windings to fit together. One observes that the end windings have a thickness, in a plane transverse to the bundles, which is roughly half the thickness of the bundles in slots 61 of magnetic circuit 60.

More generally, the thickness of the end windings is roughly equal to a fraction of the thickness of the bundles, this fraction depending on the number of layers of coils placed in a slot plane. Thus, if the number of layers is equal to 2, the thickness of the end windings is roughly equal to half the thickness of the bundle. If the number of layers is equal to 3, the thickness of the end windings is roughly equal to a third of the thickness of the bundle.

In each slot plane 62 or 63, the coils are distributed in two layers 64, 65 or 66, 67. In the same slot plane, the coils are reversed from one layer to the other in order to ensure that the end windings fit together.

The coils described in reference to FIGS. 6 and 7 have the advantage of reducing the length of the end windings, as their shape is very compact.

This makes it possible to reduce the quantity of copper used in comparison with a machine whose winding is of the overlapping type, and to improve the electrical performance. The voltage at the no-load condition of the machine is not modified. The resistance and the leakage reactance of the end windings are reduced, which enables one to obtain a better external characteristic (voltage as a function of the current) than for machines with overlapping windings.

For variable speed applications, this leads to a better use of the converters.

Furthermore, the "copper" losses are therefore also reduced, whereas they generally represent 50% of the total losses of the machine. The yield of the machine is thus improved.

The coils illustrated in FIGS. 6 and 7 are planar because they are intended for a discoid machine. For a machine with cylindrical armatures, they form a portion of a cylinder whose curvature depends on the diameter of the machine.

FIG. 4b shows that the two winding planes 11 and 12 are identical. There is only an offset between the two planes by a determined number of slots.

This offsetting is necessary to obtain a winding which has the same electrical performance as an overlapping-type winding. This matter will be seen subsequently in the description.

This offsetting is determined by an expert in the field, taking into account the characteristics of the machine and particularly the number of slots, the number of poles, the number of phases, and the pitch of the winding.

In the example illustrated in FIG. 4b, the offsetting is by 7 slots, if one takes into account the distribution of the phases, and by one slot if one only takes into account the distribution of the coils in the slots.

One also observes that, in the same plane, the two layers can be reversed, without affecting the identity between the two planes. Only the offsetting between the two planes will have to be employed.

In order to form the circuits of each of the phases, it is possible to produce the coils independently, then to connect them before or after they are positioned in the slots. It is also possible to produce each electrical circuit directly, successively or continuously forming the coils.

One can refer to FIG. 5, in particular, which illustrates the two parallel circuits of phase 1 for the machine of FIGS. 3 and 4. These two circuits, respectively, have as input UE1 and UE2 (not represented), and as output US1 (not represented) and US2.

The circuit (UE1, US1) can be produced continuously by continuously and successively forming:

- coils 43, 44 and 45 which will be placed in first layer 16 of "slot bottom" plane 12,
- then, after having completed this first layer with the coils corresponding to the other electrical circuits, coils 46, 47, 48 which will be placed in second layer 14 of "slot bottom" plane 12,
- then, after having completed this second layer, three coils situated in first layer 15 of "slot top" plane 11 whose coils 40 and 49 are illustrated in FIG. 5,
- and finally, with the first layer of the "slot top" plane completely produced with the coils of the other electrical circuits, the last three coils situated in the second layer of the "slot top" plane (which are not represented).

The other electrical circuit of phase 1 as well as the electrical circuits of phases 2 and 3 are produced in a similar way in order to completely produce the winding.

Thus, the production of the winding according to the invention in slot planes, the planes of conductors, being independent, avoids pitch raising which is required by any overlapping winding. This therefore makes it possible to eliminate this necessarily long and complex manual operation.

Furthermore, the winding according to the invention has the same electrical performance as an overlapping-type winding. This will be illustrated in reference to FIGS. 2a and 4a, but can be extended to any winding produced according to the invention.

It is recalled that FIGS. 2a and 4a respectively show the assignment of the phases to the conductors based on their position in the "slot bottom" plane or "slot top" plane of each slot, in the case of an overlapping-type winding, and, respectively, a winding according to the invention for the chosen machine example.

Examination of FIGS. 2a and 4a shows that it is possible to switch from one table to the other by inverting the phases between the "slot top" plane and the "slot bottom" plane, one slot out of six.

In a general way, it is suitable to invert the phases for the machines with a winding with a pitch of 1 to 4, one slot out of two.

For other windings, the inversion of the phases between the two slot planes is defined as a function of pitch in the case of certain slots.

This shows the electrical similarity between the overlapping-type winding and the winding according to the invention. The electrical performances are therefore not modified from one winding to the other for a given machine.

Another advantage of the winding according to the invention proceeds from this electrical similarity to the overlapping-type winding.

As indicated in the preceding, software already exists for determining the corresponding overlapping-type winding diagram for a given machine.

Now, for the majority of medium power and high polarity machines, the pitch is 1 to 4. Thus, for all these machines, the winding according to the invention can be determined using existing software for the overlapping-type windings by inverting, in the same slot, the phases assigned to the conductors between the "slot bottom" plane and the "slot top" plane, one slot out of two.

It is then sufficient to regroup the conductors in a winding in two slot planes, each plane containing at least one layer of conductors. In the example illustrated in FIGS. 4b and 5, each plane of conductors is produced with two layers of conductors, but the invention is not limited to this embodiment.

The winding according to the invention can be applied to any type of machine with cylindrical or discoid armatures. It is, however, of quite particular value for the discoid machines for which the active surfaces are generally larger than in the machines with cylindrical armatures. The possibility for automating the production of the winding according to the invention, and thereby reducing its cost, prove to be even more advantageous for the discoid machines.

It is possible to produce the winding according to the invention not only with coils but also with bars.

Furthermore, the coils can be formed with round wires or flattened wires.

What is claimed is:

1. A winding for a magnetic circuit of a rotating electrical machine in which conductors are placed in slots of the magnetic circuit in two slot planes for a three-phase electrical machine, the conductors in each slot plane including coils, each coil including two bundles located in respective slots of the magnetic circuit and two ends located outside the magnetic circuit and connecting the bundles, wherein all of the bundles of the coils of the first slot plane are located only in the first slot plane, and all of the bundles of the coils of the second slot plane are located only in the second slot plane, on only one side of the first slot plane, wherein at least the first slot plane includes first and second layers, each of the first and second layers including respective coils, and all of the bundles of the coils of the second layer of the first slot plane are located on only one side of the first layer of the first slot plane.

2. The winding for a magnetic circuit according to claim 1, wherein the coils are disposed in the slots of the magnetic circuit defining a winding with consecutive poles.

3. The winding for a magnetic circuit according to claim 1, wherein the coils are disposed in the slots of the magnetic circuit defining a winding with alternating poles.

4. The winding for a magnetic circuit according to claim 1, wherein the coils in the first and second slot planes are identical to each other and the first and second slot planes are offset in position relative to each other in the magnetic circuit.

5. A winding for a magnetic circuit of a rotating electrical machine in which conductors are placed in slots of the magnetic circuit in two slot planes for a three-phase electrical machine, the conductors in each slot plane including coils, each coil including two bundles located in respective slots of the magnetic circuit and two ends located outside the magnetic circuit and connecting the bundles, wherein all of the bundles of the coils of the first slot plane are located only in the first slot plane, and all of the bundles of the coils of the second slot plane are located only in the second slot plane, on only one side of the first slot plane, wherein each of the first and second slot planes includes at least first and second layers of coils, the coils of each first layer of each of the first and second slot planes are symmetrical with respect to a median plane of the bundles of the coils, and each end of a coil has a thickness smaller than the bundles of the respective coils.

6. The winding for a magnetic circuit according to claim 5, wherein the coils are disposed in the slots of the magnetic circuit defining a winding with consecutive poles.

7. The winding for a magnetic circuit according to claim 5, wherein the coils are disposed in the slots of the magnetic circuit defining a winding with alternating poles.

8. The winding for a magnetic circuit according to claim 5, wherein the coils in the first and second slot planes are identical to each other and the first and second slot planes are offset in position relative to each other in the magnetic circuit.

* * * * *